United States Patent [19]
Oka

[11] Patent Number: 5,452,959
[45] Date of Patent: Sep. 26, 1995

[54] APPARATUS FOR PRINTING CHARACTERS ONTO BOTH SURFACES OF A SHEET MATERIAL

[75] Inventor: Yasuo Oka, Haramachi, Japan

[73] Assignees: Ko-Pack Corporation, Tokyo; I.E.S. Co., Ltd., Fukushima, both of Japan

[21] Appl. No.: 296,752

[22] Filed: Aug. 26, 1994

[51] Int. Cl.⁶ ..................................................... B41J 1/50
[52] U.S. Cl. ......................... 400/149; 400/188; 400/621; 83/404
[58] Field of Search .................... 400/188, 621, 400/149, 621.1, 150, 82, 279; 83/78, 149, 167, 404

[56] References Cited

U.S. PATENT DOCUMENTS

| | | | |
|---|---|---|---|
| 4,313,359 | 2/1982 | Smoravek | 83/167 |
| 4,375,923 | 3/1983 | Hidaka et al. | 400/82 |
| 4,686,540 | 8/1987 | Leslie | 400/582 |
| 4,781,478 | 11/1988 | Eguchi | 400/322 |
| 5,138,336 | 8/1992 | Goto | 346/76 PH |
| 5,188,470 | 2/1993 | Matsubara et al. | 400/621 |
| 5,259,678 | 11/1993 | Uchida | 400/82 |
| 5,268,766 | 12/1993 | Nakadai et al. | 400/621 |

FOREIGN PATENT DOCUMENTS

0003765  1/1986  Japan ..................................... 400/188

*Primary Examiner*—Ren Yan
*Assistant Examiner*—John S. Hilten
*Attorney, Agent, or Firm*—Frishauf, Holtz, Goodman, Langer & Chick

[57] ABSTRACT

An apparatus for printing letters, numerical characters and symbols in response to electronic data transmitted from a host machine onto both surfaces of a sheet of paper or film. Rollers move the sheet material along a path toward an outlet, a first printer prints on one of the surfaces of the sheet material within the path, and a second printer prints on the other surface of the sheet material within the path at a position nearer to the outlet than the first printer. A position detector detects the position of the sheet material within the path, and a controller concurrently and independently processes at least parts of the printing operations by the first and second printers based on the position detected by the position detector.

6 Claims, 4 Drawing Sheets

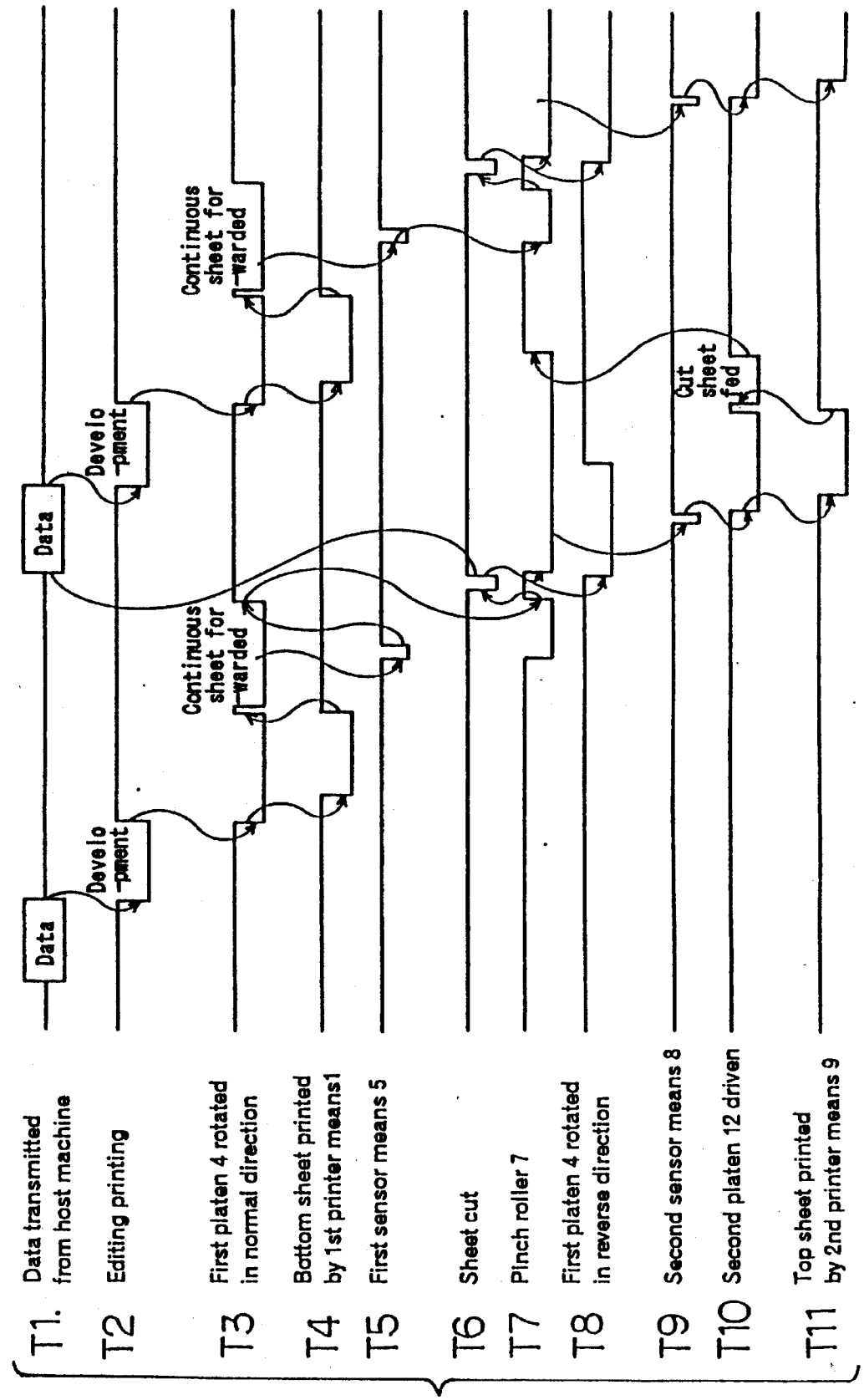

APPARATUS FOR PRINTING CHARACTERS ONTO BOTH SURFACES OF A SHEET MATERIAL

BACKGROUND OF THE INVENTION

1. Field of the Invention

The present invention relates to an apparatus for printing characters onto both surfaces of a sheet material, and more particularly to an apparatus for printing letters, numerical characters and symbols in response to electronic data transmitted from a host machine such as a data processor of a computer onto both surfaces of a sheet of paper or film.

2. Description of the Prior Art

Printers such as a line printer are widely used as an output terminal equipment of various electronic data processors that output letters and numerical characters in response to electronic data input. Printers of this type are often capable of printing only on one side of a sheet material, and the other side of the sheet is wasted.

There are known printers for cut sheets that are provided with a mechanism for printing characters onto both surfaces. In such a printer, one of the sheet surfaces is printed with characters by the printer head and then carried forward by the carrier means, whereupon the sheet is turned either by manual or automatic operation. The now turned sheet is returned to the inlet of the carrier means, where the printer head prints characters on the thus turned back surface of the sheet material. Conventional printers of this type require an extra step of turning the sheet over after printing on one side has been completed, taking twice as long as the time required to print on one side only. In case of an automatic operation, an extra means is needed to turn the sheet over.

Printers used to print characters onto a continuous sheet material wound up into a roll or folded alternately into pleats along the cutting perforations are also capable of printing on only one side of a sheet, and none is capable of printing on both sides.

SUMMARY OF THE INVENTION

The main object of the present invention is to provide a printer capable of printing characters onto both surfaces of a long and continuous sheet material.

Another object of the present invention is to provide a printer which can print characters on both surfaces of a sheet material without turning the sheet after printing on one of the surfaces has been completed.

Still another object of the present invention is to provide a printer which can shorten the time required to print characters onto both sides of a sheet material.

Still another object of the present invention is to provide a printer which can print characters onto both surfaces of a sheet material in a relatively short period of time and can pay out the final product in the form of cut sheets with both surfaces printed with characters.

According to one embodiment of this invention, the apparatus for printing characters on both surfaces of a sheet material comprises a carrier which moves along a predetermined path to carry a sheet material having a first top surface and a second bottom surface toward an outlet port, a first printer device which prints characters onto said first surface of a sheet material at a predetermined position within said path, a second printer device which prints characters onto said second surface of a sheet material at a predetermined position located nearer to said outlet port than the first printer device, a position detector which detects the position of the sheet material within the path, and a control means which concurrently and independently processes at least certain parts of the printing operations carried out by said first and second printer device.

The apparatus of the present invention is capable of printing characters onto both surfaces of any cut sheet or continuous sheet alternately folded into pleats along the cutting perforations provided thereon at a regular interval.

In one preferred embodiment of the present invention, said first printer device includes a first platen roller which is disposed adjacent to said path with its axial center directed orthogonal to the direction in which the sheet material travels to support the second surface of the sheet material, a first printer head means which prints characters onto the first top surface of the sheet material at a position in front of said first platen roller, and a first carrier means which causes the first printer head means to laterally reciprocate at a constant rate in the print line direction which is substantially parallel to the axial center of the first platen roller. Said second printer means includes a second platen roller which is disposed adjacent to said path with its axial center directed orthogonal to the direction in which the sheet material travels and which supports the second surface of the sheet material, and a second printer head means which prints characters onto the second surface of the sheet material at a position in front of said first platen, a second printer head which prints characters on said second surface of the sheet material at a position in front of said second platen roller, and a second carrier means which causes the second printer head means to reciprocate at a constant rate in the print line direction which is substantially parallel with the axial center of the second platen roller.

The first and the second printer head means may respectively include a thermal dot printer head which is provided with small dots of which heat generation is electrically controlled and that are arranged in the direction of sheet feed. In this case, sheet materials provided with heat sensitive coloring coating may be used.

The first and the second printer head means may also include said thermal dot printer head, thermal transfer ink ribbon having a surface layer of pigment which is to be transferred onto said sheet material in response to the heating pattern of the small dots formed by the thermal dot printer head, and a ribbon feeder mechanism which feeds the ribbon in the printer line direction as the thermal dot printer head moves. In this case, it is possible to use ordinary sheet materials that are not provided with the heat sensitive coloring coating on its surface.

In cases where an ordinary sheet material is used, an ink jet printer head or wire dot printer head of the known type may be used as the first and the second printer head means.

In one preferred embodiment of the present invention, said position detector means includes a sensor means which detects the tip end of the sheet material at a predetermined position within said path extending between said first and the second printer means, and a measuring means such as a rotary encoder which generates signals representing the distance travelled by said sheet material. Preferably, the sensor means further includes a first sensor located nearer to said first printer means and a second sensor located nearer to said second printer means. In this case, said control means detects the position of the sheet material based on signals transmitted from these sensor means and the measuring means, and concurrently but independently processes at least portions of the printing operations by the first and the second printing means respectively.

According to another embodiment wherein a roll of continuous sheet material without the cutting perforations is used, a sheet cutter which cuts the sheet material in the print line direction at a given interval and a pinch roller means which feeds pieces of sheet material thus cut towards the second printer means are provided between the first and the second printer means, and more preferably between the first and the second sensor means.

In this case, said control means controls the operations of the sheet cutter means and the pinch roller means based on the detected position of the sheet material. When a predetermined amount of the continuous sheet material has passed the position where the sheet material is to be cut by the sheet cutter means after its forward end passes the first printer means, movement of the sheet material by said carrier means is temporarily suspended and the sheet cutter means is actuated, whereupon the continuous sheet material is cut in the print line direction into separate sheets of said predetermined size and carried forward into the second printer means by said pinch roller means. The first surface of the cut sheet has already been printed with characters by the first printer means, and the second surface is to be printed by the second printer means. Thus, the sheet material comes out from the outlet port in the form of a cut sheet after having passed the second printer means. The continuous sheet left in the sheet cutter means is reversed by the carrier means in its feed direction toward the initial position, where it is printed with characters by the first printer means. Subsequently, the first printer means prints characters onto the first surface of the sheet material. While the first printer means is in operation, the sheet material of a predetermined size cut from the continuous sheet material is carried over to the second printer means by the pinch roller means, whereupon the second printer means prints characters onto the second surface by the simultaneous parallel processing by said control means. The initial position of the second printer means operation is determined based on the detection of the forward end of the cut sheet by the position detection means or by the second sensor.

Preferably, a means to selectively inhibit the operation of said sheet cutter means can be provided, which inhibition means allows the sheet cutter means to operate when the sheet material fed into the apparatus is a continuous sheet without perforations, and inhibits the same from operating when the sheet material fed into the apparatus is a continuous sheet material with perforations or is in the form of cut sheet. The inhibition means may comprise a switch which interlockingly operates in accordance with the selection of a feeder device suitable for the type of the sheet material mounted on the printer.

These and other features and advantages of the present invention will become more apparent from the following description of the non-limiting embodiment taken in conjunction with the accompanying drawings.

BRIEF DESCRIPTION OF THE DRAWINGS

FIG. 7 is a timing chart to show the operations of various parts of the embodiment.

DESCRIPTION OF THE PREFERRED EMBODIMENT

Figure 1:
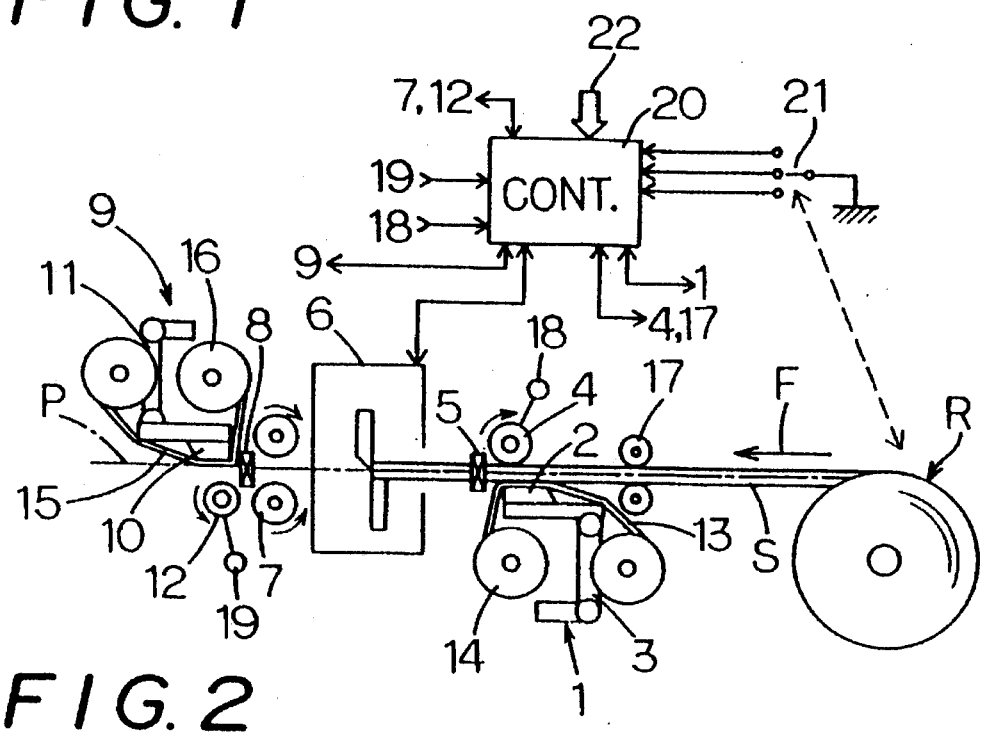
FIG. 1 is a schematic diagram to show the construction of the printer according to one embodiment of the present invention.

Referring to FIG. 1, a roll R of continuous sheet material without cutting perforations is rotatably supported, and a sheet material S paid out from the roll R is fed into a path P shown by dot-and-chain by a first pinch roller 17 provided near the inlet port of said path P and carried in the direction of an arrow F in the drawing. In this embodiment, the sheet S is an ordinary paper having no heat sensitive coloring coating.

In the path P, there are provided a first pinch roller 17, a first platen roller 4, a first sensor 5, a sheet cutter 6, a second pinch roller 7, a second sensor 8, and a second platen roller 12 respectively at predetermined positions in this order. The first platen roller 4 is disposed above the path P and contacts the top surface of the sheet S; the second platen roller 12 is disposed below the path and contacts the bottom surface of the sheet S. The first platen roller 4 and the first pinch roller 17 constitute a feed means which can be rotated in the forward/backward directions, allowing the sheet S to move forward/backward along said path P with respect to the direction F at a constant speed. The second platen roller 12 and the second pinch roller 7 constitute a feed means which can be rotated in the forward/backward directions, allowing the cut sheet S1 (see FIG. 5) which has been cut by the sheet cutter 6 to move in the direction F at a constant speed.

A first printer device 1 (hereinafter referred to as first printer means) is disposed below the first platen roller 4 across the path P. The first printer means 1 comprises a thermal dot printer head 2 of the known type which is provided with a plurality of electrically controlled heat-generating fine dots in parallel to the direction F of the sheet S movement, a carrier means 3 which moves the printer head 2 away from the platen roller 4, when not in printing operation, toward the platen roller 4 at the time of printing operation based on the printing/editing data from a control means 20 to be described, and substantially in the print line direction commanded by the control means 20 which is substantially parallel to the axial line of the first platen roller 4 at a constant speed, a heat transfer ink ribbon 13 having a layer of pigment to be transferred onto the sheet S in the pattern of thermal dots on the printer head 2, and a ribbon feed mechanism 14 which feeds the ribbon in the print line direction as the printer head 2 is carried by said carrier mechanism 3.

A second printer device 9 (hereinafter referred to as second printer means) is disposed above the second platen roller 12 across the path P. Similarly to the first printer means 1, the second printer means 9 comprises a thermal dot printer head 10 of the known type which is provided with a plurality of electrically controlled heat-generating fine dots in parallel to the direction F of the sheet S movement, a carrier mechanism 11 which moves the printer head 10 away from the platen roller 12 when not in printing operation but toward the platen roller 12 at the time of printing operation based on the printing/editing data from a control means 20 to be described, and substantially in the print line direction commanded by the control means 20 which is substantially parallel to the axial line of the first platen roller 12 at a constant speed, a heat transfer ink ribbon 15 having a layer of pigment to be transferred on the sheet S in the pattern of thermal dots on the printer head 10, and a ribbon feed mechanism 16 which feeds the ribbon in the print line direction as the printer head 2 is moved by said carrier mechanism 3.

In FIGS. 1 through 5, although the ribbon feed mechanisms 14 and 16 are shown to feed the ribbons 13 and 15 in the direction parallel to the sheet surface, the actual construction is such that the ribbons 13 and 15 are fed in the direction vertical to the sheet surface or in the direction parallel to the axial line of the platen rollers 4 and 12.

The first sensor 5 detects the first end of the sheet S at a predetermined position directly downstream the first printer means, while the second sensor 8 detects the first end of the sheet S (cut sheet S1 cut by the sheet cutter 6) at a position located in between the second pinch roller 7 and the second platen roller 12.

Rotation of the first platen roller 4 (or the first pinch roller 17) is measured by the first rotary encoder 18, and that of the second platen roller 12 (or the second pinch roller 7) by the second rotary encoder 19.

Output signals from the first sensor 5, the second sensor 8, the first rotary encoder 18, and the second rotary encoder 19 are inputted at the control device 20 which is a microcomputer. The control device 20 is also inputted from a switch 21 with signals for mode selection suitable for the type of sheet material S. The switch 21 transmits a first mode signal when the sheet S mounted on the printer is a cut sheet, a second mode signal when the sheet is a continuous sheet (roll R) without perforations, and a third mode signal in case of a continuous sheet with perforations. The switch 21 may be a manual switch or an automatic switch that can automatically switch the modes depending on whether a cut sheet feeder or cut sheet holder is mounted on the printer, or whether a sheet roll R or a continuous sheet folded in pleats along the cutting perforations is mounted. In the embodiment shown, the second mode signal is inputted at the control device 20 from the switch 21.

As printing data 22 is transmitted from an external data processing device such as a computer (not shown), the control device 20 effectively controls the operation of respective means in the printer based on the input data and causes the printer heads 1 and 9 to print data on both surfaces of the sheet S. Although not shown, the control device 20 comprises a buffer memory which stores the input printing data 22 in the known manner, a character memory which generates character data from the printing data, a printing/editing processor which carries out formatting/developing of the printing data based on the printing format control data contained in the printing data, and a main processor which effectively controls the operation of each of the pinch rollers 17, 7, platen rollers 4, 12, printers 1, 9 and the sheet cutter 6 based on the signals from each of the sensors and encoders as well as data from the printing/editing processor. The main processor identifies the mode selection signal from the switch 21, and inhibits the operations other than those compatible with the mode signal from the switch 21. For example, when the first or the third mode signal is inputted, the sheet cutter 6 is switched off by the control device 20 and is held incapable of cutting operation.

Referring now to FIGS. 1 through 5, the operation of the printer according to an embodiment of the present invention will be described.

Figure 2:
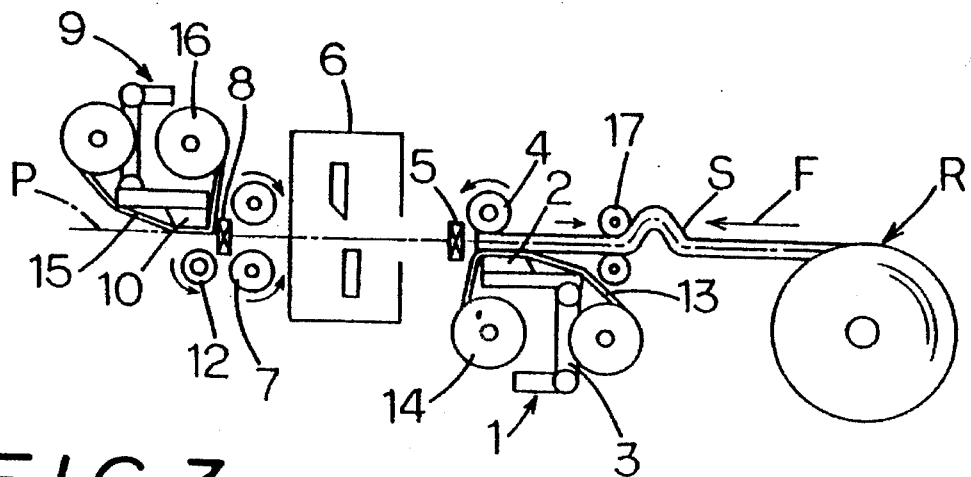
FIGS. 2, 3, 4 and 5 show the operations of the embodiment in sequence.

As shown in FIG. 1, the continuous sheet S is pulled out from the roll R and fed onto the path P via the first pinch roller 17. As the first sensor 5 detects the tip end of the sheet S, the first pinch roller 17 and the first platen roller 4 are rotated to cause the tip end to move slightly ahead of the sheet cutter 6 and halt. The sheet cutter 6 is actuated to cut the continuous sheet S, and the sheet S is moved backward by the reverse rotation of the first pinch roller 17 and the first platen roller 4. As shown in FIG. 2, the tip end of the sheet S which has been cut straight by the cutter 6 returns to the original position where the sheet S is to be printed with characters by the first printer means 1. The edge cut away from the sheet S is carried forward toward the outlet of the path P to be discharged by the rotation of the second pinch roller 7 and the second platen roller 12.

Figure 3:
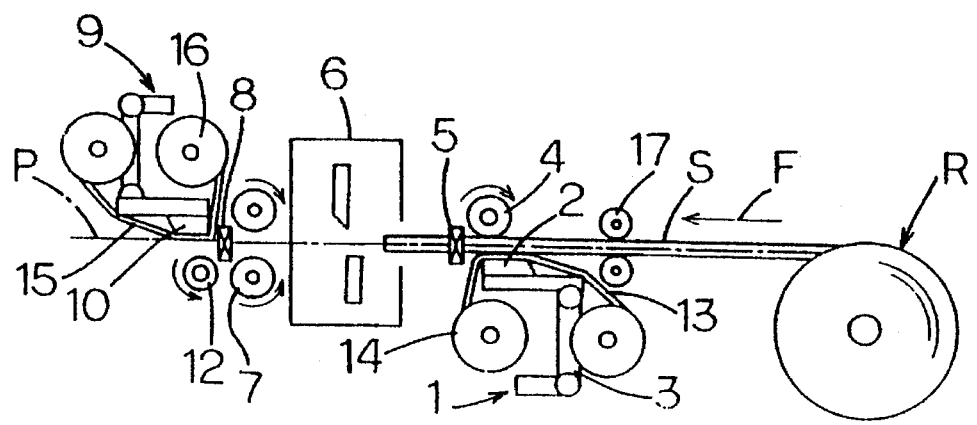

As the tip end of the sheet S returns to the original printing position, the first printer means starts printing characters line by line based on data inputted from the control device 20. Printing line is shifted by stepped rotation of the first pinch roller 17 and the first platen roller 4 (FIG. 3). In the meantime, position of the sheet S at its tip end is kept under measurement by the control device 20 based on the measurement signal from the encoder 18.

Figure 4:
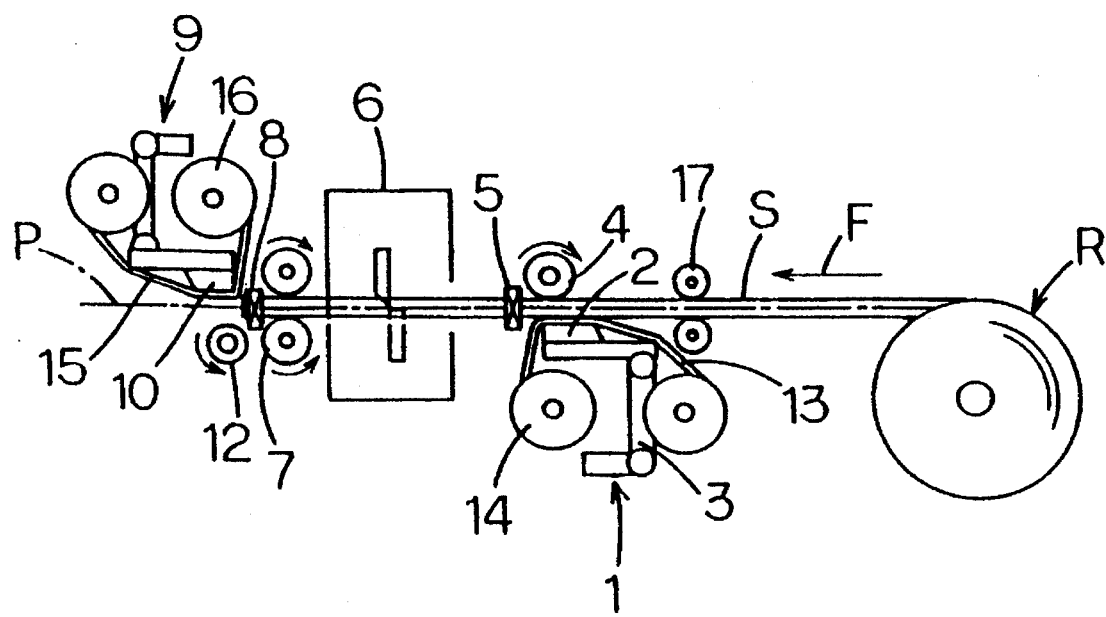

In this manner, first page printing is performed on the bottom surface of the sheet S, and when this is complete, the first pinch roller 17 and the first platen roller 4 are continuously rotated as shown in FIG. 4 to forward the sheet S in the direction F. Data on the cutting position of the sheet cutter 6 is stored in the control device 20 as a preset data. As the tip end of the sheet S reaches the cutting position and is carried farther forward in the direction F for the length corresponding to the sheet length predetermined by the printing format data, the control device 20 outputs a command to suspend the rollers 17 and 4 and a command to actuate the cutter 6, whereby the continuous sheet S is cut into a cut sheet having said predetermined length.

Figure 5:
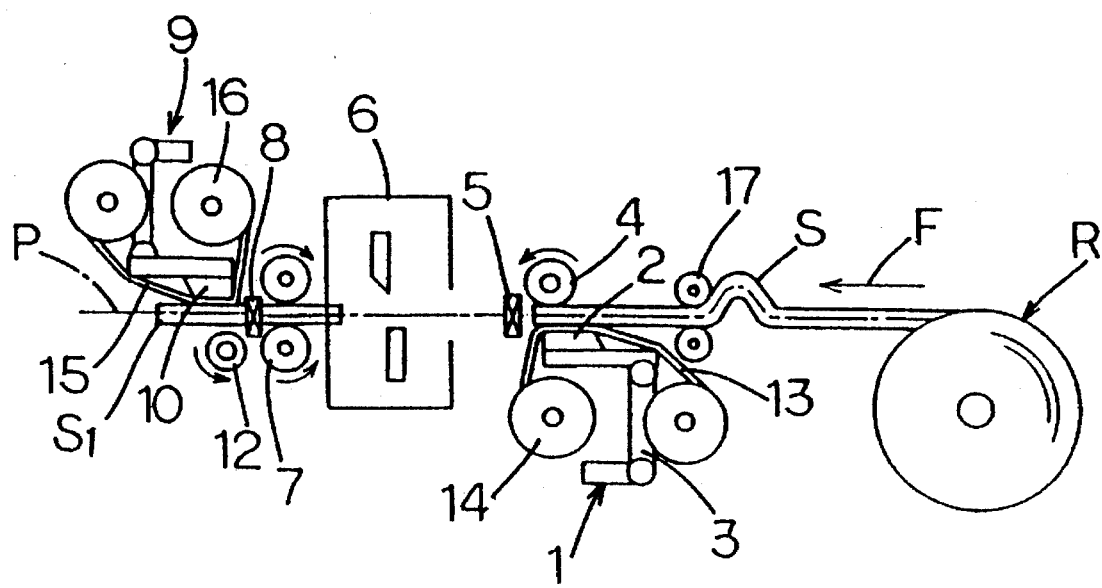

As shown in FIG. 5, the tip end of the cut sheet S1 thus obtained is detected by the second sensor 8 and sent to the second printer means 9 by the second pinch roller 7 and the second platen roller 12. The second printer means 9 is given the data on the original printing position from the control device 20 based on the data concerning detection of the tip end of the cut sheet S1 by the second sensor 8, and performs the second page printing operation for printing characters line by line on the top surface of the cut sheet S1. Printing lines are shifted by stepped rotation of the second pinch roller 7 and the second platen roller 12.

While the second printer means 9 is in printing operation, the tip end of the continuous sheet S left at the cutting position by the cutter 6 is returned to the initial printing position of the first printer means 1 as shown in FIG. 2, and the third page printing is carried out on the top surface in the manner described with respect to FIG. 3.

Second page printing by the second printer means 9 and third page printing by the first printer means 1 are processed simultaneously and yet partly independently of each other by the control device. Time-wise redundancy in continuous printing of both surfaces of sheet material is thus eliminated.

As regards the first and the second printer means 1 and 9, explanation is omitted for the carrier mechanisms 3, 11, heat transfer ink ribbons 13, 15, and ribbon feed mechanisms 14, 16. They operate in the same manner as those in the conventional line printer. The continuous sheet S used in this embodiment is an ordinary type paper having no heat coloring coating. In case a continuous sheet having heat coloring coating is used, the heat transfer ink ribbons 13, 15 and the ribbon feed mechanisms 14, 16 can be omitted.

Figure 6:
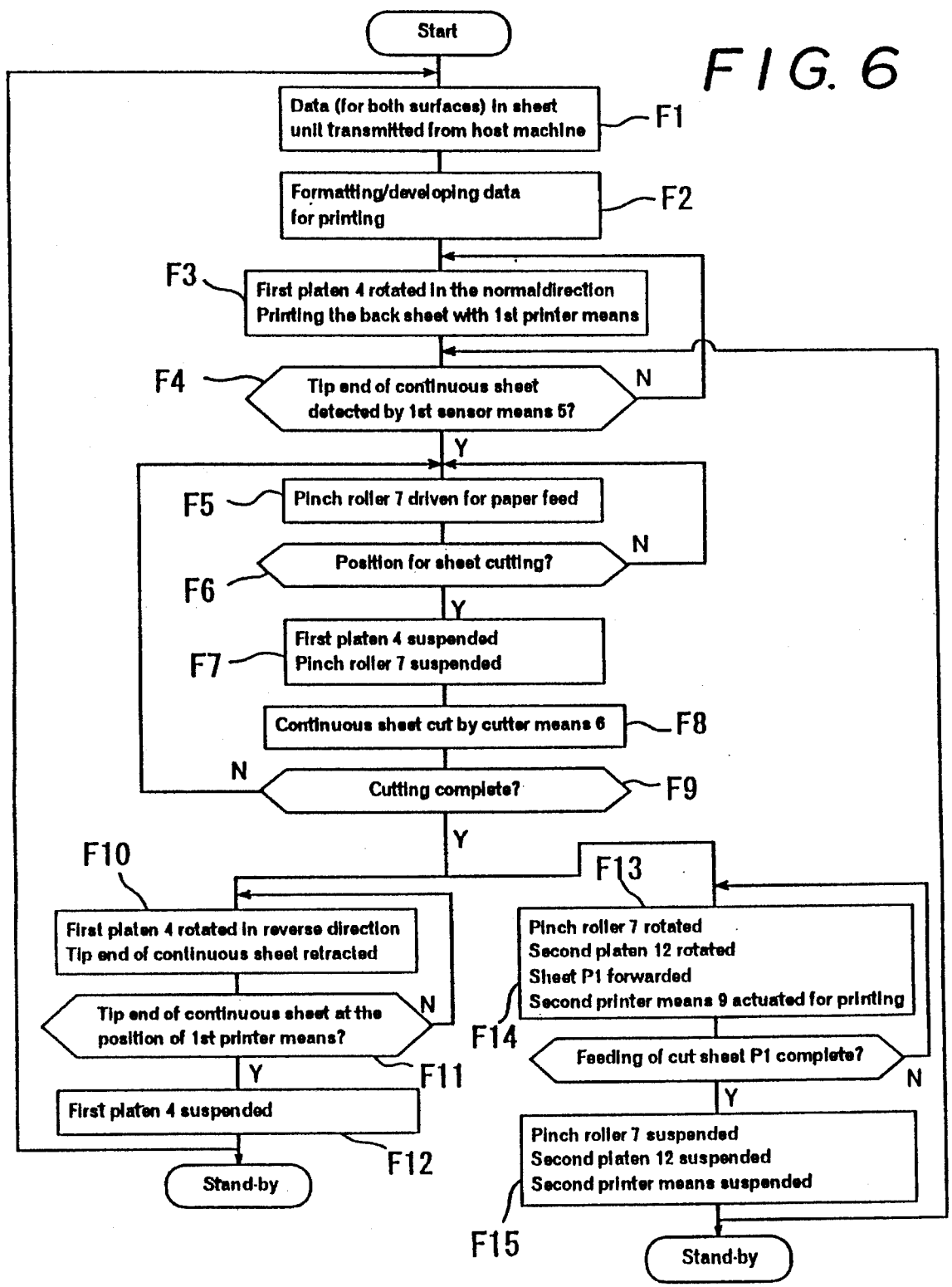
FIG. 6 shows the flow of operation sequence of the control means according to said embodiment.

FIG. 6 shows the flow of steady-state control operation of the control device 20. In step F1, printing data for two pages is read out from the printing data inputted into the buffer memory from a host machine. In step F2, formatting/ developing of the printing data for each page is performed based on the stored program.

In step F3, the first printer means 1 is actuated for first page character printing on the top surface of the sheet while the continuous sheet S is sent downstream by the forward rotation of the first platen roller 4.

In step F4, the tip end of the moving sheet is detected based on the result of detection by the first sensor 5. Upon detection of the tip end, a command is generated to actuate the the second pinch roller 7 (step F5).

In step F6, whether or not the continuous sheet S has traveled a predetermined distance after passing the cutting position of the sheet cutter 6 is detected based on the result of measurement by the encoder 18, and if YES, each of the rollers is suspended in step F7 and the sheet is cut by the sheet cutter 6 in step F8.

In step F9, whether or not the cutting operation is complete is judged, and if No, steps F5 through F9 are repeated. When the cutting operation is complete, steps F10 and F13 are performed, with the first and the second printer means 1 and 9 and their associated means being concurrently and independently operated and controlled.

In other words, the continuous sheet S is retracted after cutting operation by the reverse rotation of the first platen roller 4 in step F10, and whether or not the tip end of thus retracted sheet has returned to the original printing position by the first printer means 1 is judged in step F11. If YES, rotation of the first platen roller 4 is suspended and held on stand-by in step F12. If there is third page printing data to be performed, the operation is resumed from step F1.

In the meantime, the cut sheet S1 cut away from the continuous sheet S is fed into the second printer means 9 by the rotation of the second pinch roller 7 and the second platen roller 12 in step F13, and second page character printing is conducted on the top surface of the cut sheet S1 by the second printer means 9. When it is judged that the cut sheet S1 has been fed into the second printer means for its entire length in step F14, the second pinch roller 7, second platen roller 12 and second printer means 9 are suspended and held on stand-by. If there is fourth page printing data to be performed, the operation is resumed from step F5.

FIG. 7 is a chart showing the timing of each part under steady-state operation. As the printing data for two pages, i.e. for the first and the second pages, from a host computer is inputted into the buffer memory of the control device 20 (T1), the printing data is developed based on the editing/format information (T2), and the first platen roller 4 is rotated in the forward direction based on the result of formatting/development (T3). The continuous sheet S is forwarded in the direction F and is printed with the first page characters on its bottom surface by the first printer means 1 (T4).

When printing by the first printer means 1 is complete, the first platen roller 4 is further rotated in the forward direction to forward the sheet S (T3) until its tip end is detected by the first sensor 5. Whereupon, the second pinch roller 7 is actuated to send the sheet S farther in the direction F. As the sheet S reaches the position where it is cut by the sheet cutter 6, the second pinch roller 7 and the first platen roller 4 are suspended (T7, T3) and the sheet cutter 6 is actuated to cut the sheet S (T6). The cut sheet S1 thus obtained is separated from the continuous sheet S, leaving the freshly cut edge of the sheet S as its new tip end. The cut sheet S1 and the continuous sheet S are processed separately.

Upon completion of cutting by the sheet cutter 6 (T6), the second pinch roller 7 is actuated once again to send the cut sheet S1 toward the downstream second printer means 9 (T7). At the same time, the first platen roller 4 is rotated in the reverse direction until the newly formed tip end of the sheet S reaches the initial position for printing by the first printer means 1 (T8). Concurrently with completion of cutting by the sheet cutter 6 (T6), the control device 20 reads in the printing data for subsequent two pages (Pages 3 and 4) (T1), carries out formatting/developing of the printing data (T2) in the manner described above, and causes the first printer means 1 to print the Page 3 printing data on the bottom surface of the sheet S (T4) as the first platen roller 4 is rotated in the forward direction (T3).

In the meantime, as the tip end of the cut sheet S1 fed into the second printer means 9 upon completion of cutting by the sheet cutter 6 (T6) is detected by the second sensor 8 (T9), the second platen roller 12 starts rotating (T10), and the Page 2 printing data is printed on the top surface of the cut sheet S1 by the second printer means 9 (T11). The second platen roller 12 continues its rotation even after the printing operation is complete until the cut sheet S1 is ejected from the outlet of the path P (T10). The concurrently rotating second pinch roller 7 is also suspended (T7).

In the foregoing description, the bottom surface of a sheet material is printed by the first printer means 1 before printing the top surface by the second printer means 9; however, the present invention apparatus can be constructed to print the top surface by the first printer means 1 before printing the bottom surface by the second printing means 9.

When a sheet material having cutting perforations at regular interval is used, the control device 20 operates under the first mode of control based on the mode selection signals transmitted from the switch 21. Once the position of perforations is aligned with the register mark on the printer, it is no longer necessary to detect the tip end of the sheet material, and the sensors 5, 8 and the sheet cutter 6 can be omitted. Operations of the related means may be synchronously controlled based on the measurement signals from the encoders 18, 19. The first and the second printer means are controlled to cooperate with each other.

When cut sheet material is used, the control device 20 operates under the third mode of control based on the mode selection signals from the switch 21, and the sheet cutter 6 and its operation need not be used.

What is claimed is:

1. An apparatus for printing characters onto both surfaces of a sheet material, comprising:

feed means for moving a sheet material along a predetermined path toward an outlet of said predetermined path, the sheet material having first and second surfaces;

a first printer device which prints characters onto said first surface of the sheet material at a predetermined position within said path;

a second printer device which prints characters onto said second surface of the sheet material at a predetermined position located farther toward said outlet than the first printer device;

a position detector which detects the position of the sheet material within the path;

a controller which concurrently and independently processes at least parts of the printing operations by said first and second printer devices;

a sheet cutter which is located between said first and second printer devices to cut the sheet material into a predetermined length along a print line direction; and a pinch roller located along said path and downstream of said sheet cutter, and which sends a cut sheet which was cut by the sheet cutter toward said second printer device.

2. The apparatus as claimed in claim 1 wherein:

said first printer device comprises:
- a first platen roller which is disposed adjacent to said path, said first platen roller having an axial center directed orthogonal to the direction in which the sheet material travels, to support said second surface of the sheet material;
- a first printer head which is disposed above said first platen roller and which prints characters onto said first surface of the sheet material;
- a first carrier which causes the first printer head to reciprocate at a constant rate in the print line direction which is substantially parallel with the axial center of the first platen roller; and said second printer device comprises:
- a second platen roller which is disposed adjacent to said path, said second platen roller having an axial center directed orthogonal to the direction in which the sheet material travels, to support the first surface of said sheet material;
- a second printer head which is disposed above said second platen roller and which prints characters on said second surface of the sheet material; and
- a second carrier which moves the second printer head in the print line direction substantially parallel with the axial center of said second platen roller at a constant rate.

3. The apparatus as claimed in claim 2 wherein said first and second printer heads each comprise a thermal dot printer head each of which is arranged along the direction of sheet movement, each printer head including plural micro-dots of which heat generation is controlled electrically.

4. The apparatus as claimed in claim 2 wherein said first and second printer heads each comprise:
- a thermal dot printer head each of which is arranged along the direction of sheet movement, each printer head including plural micro-dots of which heat generation is controlled electrically;
- a thermal transfer ink ribbon which has a surface layer of pigment to be transferred onto said sheet material in a pattern corresponding to heated micro-dots of the respective thermal dot printer head; and
- a ribbon supply mechanism which supplies the ribbon in said print line direction concurrently with the movement of the respective thermal dot printer head.

5. The apparatus as claimed in claim 1 wherein said position detector includes:
- a sensor device which detects a tip end of said sheet material at a predetermined position within the path between the first and the second printer devices; and
- a measurement device which generates a distance signal corresponding to a distance of the sheet movement caused by the feed means.

6. The apparatus as claimed in claim 5 wherein:

said sensor device includes a first sensor provided at a position nearer to said first printer device; and a second sensor which is provided nearer to said second printer device; and the controller detects a position of the sheet material based on signals output from said first and second sensors and from said measurement means, and wherein said controller concurrently and independently processes at least parts of printing operations by said first and second printer devices based on the detected sheet position.

* * * * *